March 15, 1949.　　　R. B. MARSHALL　　　2,464,703

HEATING SYSTEM

Filed May 8, 1946

Inventor
RICHARD B. MARSHALL.

Patented Mar. 15, 1949

2,464,703

UNITED STATES PATENT OFFICE 2,464,703

HEATING SYSTEM

Richard B. Marshall, Detroit, Mich., assignor to Electromaster, Inc., Detroit, Mich., a corporation of Michigan Application May 8, 1946, Serial No. 668,271

4 Claims. (Cl. 219—39)

This invention relates to a heating system, and particularly to an improved apparatus for heating homes and buildings of similar size by electricity. This application constitutes a continuation-in-part of my copending application Serial No. 668,269, filed on even date herewith, now Patent No. 2,434,574, dated January 13, 1948.

The use of electricity for domestic heating purposes has been widely advocated due to the cleanliness and susceptibility of control of electrical heating apparatus, but to date, large scale heating of homes and other small buildings has been a practical impossibility due to the fact that all of the available electrical generating equipment is already required to supply the normal peak power load incurred by present day uses of electricity independent of home heating. Accordingly, the wide scale application of electrical heating to homes would immediately exceed the peak power capacity of available generating equipment and thus the power companies are placed in the undesirable position of having to refuse to supply the additional power requirements for domestic electric heating, despite the obvious attraction of the unity power factor load inherent in electric heating.

In accordance with this invention, an improved apparatus for heating by electricity is provided which draws electric power only during certain predetermined periods of each day and hence the power demand periods may be timed to coincide with the off-peak power periods of the conventional power demands upon the generating system. For example, a heating system in accordance with this invention may be adjusted to draw power only between the hours of 10:00 p. m. and 7:00 a. m., which is a well recognized "off-peak" power period in all electrical generating systems. There is a large amount of generating capacity available for use during such off-peak power periods and a heating system embodying this invention provides a very desirable unity power factor load for the available generating capacity throughout the entire off-peak power period.

The heating system contemplated by this invention comprises an insulated boiler element defining a fluid storage chamber in which a fixed quantity of high boiling point, heat storing fluid is disposed. While several types of fluids with these properties are known in the art, this invention preferably utilizes a liquid known as diphenyl oxide or mixtures thereof, such as that described in United States Patent No. 1,882,809 issued October 18, 1932, to John J. Grebe. The total heat input to the high temperature, heat storing liquid during the energization period of the electric heater provided for heating such liquid, is proportioned to exceed the expected heat demands of the room area to be heated over the entire daily period, or in other words, over the entire twenty-four hours elapsing between the beginning of the successive off-peak power period.

This invention provides an unusually simple and efficient heat transfer arrangement for heating a stream of air, which is to be supplied to the room area to be heated, by the electrically heated fluid. Inasmuch as the temperature of the heat storing fluid generally varies over a range from 200 to 700 degrees F., it is obviously impractical and dangerous to heat a stream of room heating air to the high temperatures in such range. Accordingly, this invention provides apparatus for obtaining a mixture of cool air with the excessively hot air stream obtained from the heat storing boiler to obtain a resulting temperature for the combined output air stream which is in the range of from 100 to 175 degrees F. and hence may be supplied directly to the room area to be heated without danger of injuring the walls or objects in the room.

As a further feature of this invention, a blower is provided for supplying cold air to the heat storing boiler and the blower is operated in response to the heat demands of a thermostat disposed in the room area to be heated.

Accordingly, it is an object of this invention to provide an improved apparatus for electrically heating homes and other buildings of corresponding size.

A further object of this invention is to provide an improved apparatus for electric heating which is operable only during off-peak power periods of the generating system to which it is connected, thereby assuring that the peak power generating capacity of such generating systems need not be increased to accommodate the additional load represented by the electrical heating system.

A still further object of this invention is to provide an improved heating system wherein a fixed quantity of high boiling point, heat storing liquid is electrically heated to a sufficient degree during off-peak power periods to insure that the heat stored therein will exceed the expected heat demands of the room area to be heated over an entire daily period.

Another object of this invention is to provide an improved heating apparatus for heating and storing a fixed quantity of high boiling point, heat storing fluid and characterized by the provision of a simple and efficient apparatus for effecting the transfer of heat from the high temperature fluid to a stream of air to be supplied to the room area to be heated; further, controlling the stream of air in response to the temperature demands of the room area to be heated and limiting the maximum temperature of the stream of heated air to a safe value which will permit the heated stream of air to be applied directly to the room area to be heated.

The specific nature of the invention as well as other objects and advantages thereof will become apparent to those skilled in the art from the following detailed description of the annexed sheet of drawings which, by way of preferred example only, illustrates one embodiment of the invention.

Figure 1:
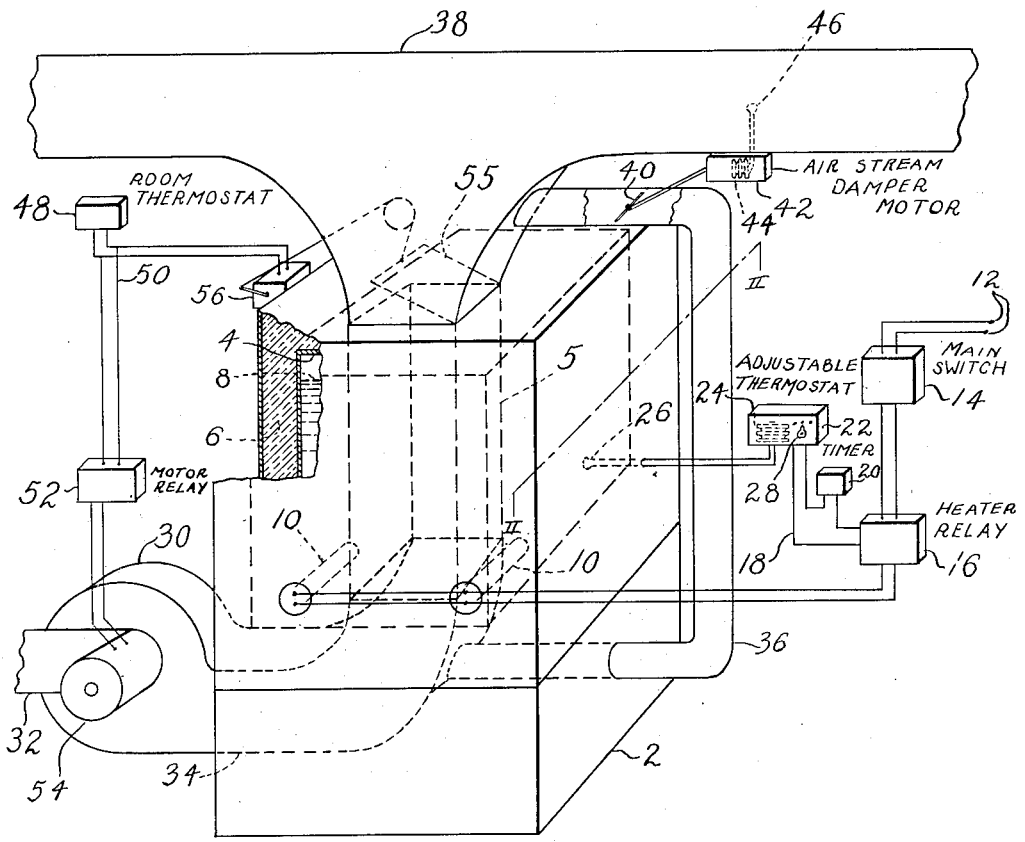
Figure 1 is a schematic perspective view of an electrical heating system embodying this invention.
Figure 2:
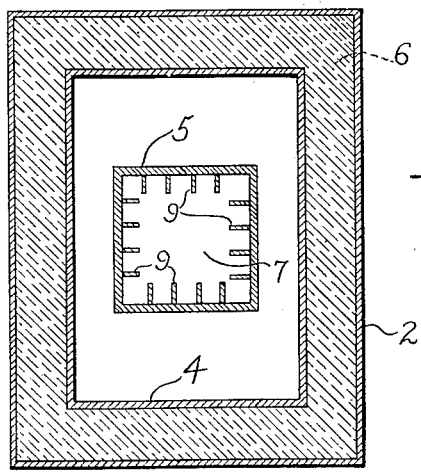
Figure 2 is a horizontal sectional view through the heat insulated boiler of the system of Figure 1, taken along the plane II—II thereof.

In accordance with this invention, a boiler 2 is provided having any convenient exterior shape, which defines a fluid heating and storing chamber 4 therein. The chamber 4 is surrounded by suitable insulation 6 to insure that the heat losses of such chamber will be minimized, and particularly that the reduction in temperature of the fluid contents of chamber 4 due to heat loss through the exterior walls of the boiler 2 will be substantially negligible over a twenty-four hour period. The fluid storing chamber 4 is divided into a generally ring-like horizontal cross-section by the provision of a tubular member 5 which extends vertically through the center of fluid storing chamber 4 and defines an air passage 7. Tubular member 5 is preferably metallic or of other heat conducting material so that the air passage 7 is disposed in good heat conducting relationship to a fluid 8 disposed in chamber 4 in surrounding relationship to tubular member 5.

While there are several different types of material that may be utilized as the heat storing fluid 8, this invention preferably contemplates the use of diphenyl oxide fluid or mixture thereof in view of the markedly superior heat properties of this fluid. Commercially available forms of diphenyl oxide mixtures have a boiling point of 500° F. at atmospheric pressure and at the elevated temperature of 725° F. produce a vapor pressure on the order of 110 pounds per square inch gauge. In addition, the specific heat of diphenyl oxide fluid is quite large and more nearly approaches that of water than other known forms of high boiling point, heat storing liquids. The lower vapor pressure of diphenyl oxide fluid at temperatures above its boiling point are of particular value in the described construction wherein the heat storing fluid is disposed in a closed chamber to prevent loss thereof, thus avoiding difficulties attendant upon replacement of lost fluid.

To heat the heat storing fluid 8, a plurality of conventional electrical heating elements 10 are provided which are energized from main power terminals 12 through a line switch 14 and the contacts (not shown) of a heater relay 16. The operation of heater relay 16 is controlled by a low voltage control circuit 18 which includes the contacts (not shown) of a timer unit 20 and an adjustable thermostat unit 22.

The timer unit 20 may comprise any one of several well known forms of cyclically operating, timing switches and the timer unit 20 is adjusted so as to close the control contacts only during a predetermined portion of its cyclic period which corresponds to the occurrence of off-peak power periods in the generating system. For purposes of example, it may be assumed that timer unit 20 closes its control contacts once each day throughout the period from 10:00 p. m. to 7:00 a. m.

The adjustable thermostat unit 22 may likewise comprise any one of several well known forms which will open its contacts upon the fluid 8 in the chamber 4 of the boiler attaining a predetermined temperature or pressure. For example, adjustable thermostat 22 may include a switch actuating bellows 24 which is in turn energized by the expansion of a suitable fluid disposed in a bulb 26 located in the interior of the chamber 4. Preferably an adjustment is provided on thermostat 22 to vary the temperature at which it will close its control contacts over a substantial range. Such adjusting mechanism may be manually operated by a knob 28. As will be seen, the adjustable thermostat in effect may be operated as a "weather selector."

From the foregoing description, it will be apparent that the fluid 8 in the boiler 2 is electrically heated only during off-peak power periods of the generating system and, furthermore, the extent of the heating of fluid 8 is controlled by the particular setting of adjustable thermostat 22. Accordingly, the total heat input to liquid 8 may be selected in accordance with the amount of heat output which it is expected that the boiler will be required to supply during the next twenty-four hour period.

To effect the transfer of heat from the electrically heated fluid 8 to the room area to be heated, a motor driven blower 30 is provided which is arranged to draw air from a suitable cold air inlet pipe 32 and force such air through a connecting pipe 34 up through the air passage 7 defined by tubular member 5. In passing through tubular member 5, the cold air is, of course, warmed by the intimate heat conducting relationship afforded with the hot fluid 8 contained in the boiler 2. To further expedite the transfer of heat from the fluid 8 to the air stream passing through air passage 7, a plurality of vertically extending ribs 9 may be provided which are metallically connected to the interior wall of tubular member 5 and project into air passage 7, thus acting as heat transfer fins without substantially impairing the flow of air through air passage 7. Other well known expedients such as staggered baffles may also be employed for increasing effective heat transfer surface.

To store sufficient heat in the electrically heated fluid 8 without requiring an excessive amount of such fluid and hence an excessively large boiler 2, it is desirable to heat the fluid 8 to a temperature in the range of 500 to 725 degrees F. It should be noted that in this temperature range the vapor pressure of diphenyl oxide fluid is so low as to eliminate any possibility of explosion of the boiler 2 by the pressures generated by the enclosed fluid 8. Accordingly, the heated air emitting from air passage 7 will be at a correspondingly high temperature and obviously, such air temperature is too high to permit the air to be directly circulated in a room area.

To reduce the temperature of the output stream of heated air from the boiler 2 to a safe value, suitable piping 36 is provided to define a by-pass air passage running between connecting pipe 34 and the hot air distributing pipe 38. A damper 40 is provided to control the flow of cold air through the by-pass passage defined by the pipe 36. While damper 40 may be manually operated, it is preferred that the damper 40 be automatically positioned by a proportioning-type motor operated damper operating mechanism 42, which is in turn responsive to the temperature of the combined output air stream. Damper operating mechanism 42 may comprise any one of several well known forms, as for example, it may be controlled by a bellows 44 which is responsive to the temperature of a suitable fluid contained within a bulb 46 disposed in the path of the combined output air stream. Damper operating mechanism 42 is preferably adjusted so as to operate damper 40 to maintain a temperature of the combined output air stream on the order of 150 to 175 degrees F.

A room thermostat 48 is provided to control the flow of heated air to the room area in response to the heat demands of the room. The contacts (not shown) of room thermostat 48 are arranged in a control circuit 50 which controls the operation of a motor relay 52, which in turn energizes the motor 54 for the blower 30. Accordingly, the blower 30 produces an air stream up through the air passage 7 to the boiler 2 only when the room thermostat 48 calls for additional heat.

To prevent loss of heat by convection currents through the air passage 7 during the periods that the blower motor 54 is not operating, a damper 55 is provided which is normally positioned to seal off the air passage 7. Damper 55 is automatically operated to an open position in response to room thermostat 48 calling for heat by any suitable mechanism, such as by a motor-powered damper operating mechanism 56 which operates concurrently with motor 54 in response to the closing of the contacts (not shown) of room thermostat 48.

It is therefore apparent that the described invention provides an improved apparatus for electrical heating of homes or similar building structures and has the particular advantage of permitting such electrical heating to be accomplished during normally off-peak power periods of generating system. Furthermore, the heating of any particular room area is accomplished by a flow of heated air of controlled temperature and the heated air flow continues only so long as the room thermostat associated with the room area calls for additional heat.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a heating system, an insulated boiler constructed to define a fluid storing chamber, a tubular member of heat conducting material mounted on said boiler and passing through said fluid storing chamber to define an air passage disposed in heat transfer relation to said fluid storing chamber, a high boiling point, heat storing fluid in said fluid chamber, means for heating said heat storing fluid, and blower means for forcing air through said air passage in said boiler, thereby producing a heated current of air.

2. In a heating system, an insulated boiler constructed to define a fluid storing chamber, a tubular member of heat conducting material mounted in said boiler and passing through said fluid storing chamber to define an air passage disposed in heat transfer relation to said fluid storing chamber, a fixed quantity of high boiling point, heat storing fluid disposed in said fluid chamber, means for heating said fluid, a cold air inlet, means for forcing cold air from said inlet through said boiler air passage, means providing a by-pass air passage around said boiler air passage, and damper means controlling the flow of air through said by-pass air passage to thereby limit the maximum temperature of the heated output air stream.

3. In a heating system, an insulated boiler constructed to define a fluid storing chamber, a tubular member of heat conducting material mounted in said boiler and passing through said fluid storing chamber to define an air passage disposed in heat transfer relation to said fluid storing chamber, a fixed quantity of high boiling point, heat storing fluid disposed in said fluid storing chamber, means for heating said heat storing fluid, blower means for forcing air through said air passage in said boiler, thereby producing a heated current of air, and a plurality of metallic fins secured to the inner walls of said tubular member and projecting into said air passage, said fins being longitudinally disposed relative to said air passage thereby increasing heat transfer to said stream of air without impairing the flow of said stream.

4. In a heating system, an insulated boiler constructed to define a fluid storing chamber, a tubular member of heat conducting material mounted in said boiler and passing through said fluid storing chamber to define an air passage disposed in heat transfer relation to said fluid storing chamber, a fixed quantity of diphenyl oxide fluid disposed in said fluid storing chamber, electrical heater means for heating said diphenyl oxide fluid, electric circuit means for energizing said heater means including a cyclically operating timing switch permitting energization of said heater means only during a predetermined portion of the cyclic period of said timing switch, a cold air inlet, blower means for forcing cold air from said inlet through said boiler air passage, means providing a by-pass air passage around said boiler air passage, damper means controlling the flow of air through said by-pass air passage to thereby limit the maximum temperature of the heated output air stream from said boiler, thermostat means responsive to the temperature of said heated output air stream controlling said damper means, means for directing said heated output air stream to a room area to be heated, and means responsive to room temperature for energizing said blower means, the heat input to said diphenyl oxide fluid during said predetermined portion of the cyclic period of said timing switch being proportioned to exceed the expected heat demands of said room area over the entire cyclic period.

RICHARD B. MARSHALL.

REFERENCES CITED

The following references are of record in the file of this patent:

UNITED STATES PATENTS

| Number | Name | Date |
| --- | --- | --- |
| 2,130,089 | Hull | Sept. 13, 1938 |
| 2,203,425 | Welch | June 4, 1940 |
| 2,259,401 | Tucker et al. | Oct. 14, 1941 |
| 2,266,257 | Osterheld | Dec. 16, 1941 |